Jan. 26, 1965   R. D. KREHBIEL   3,166,890
COMBINATION CONTROL VALVE AND MASTER CYLINDER
Filed Aug. 26, 1963
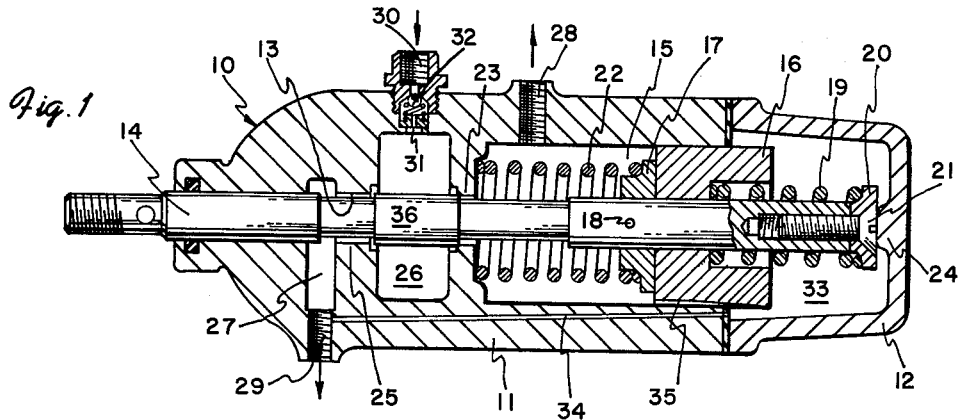
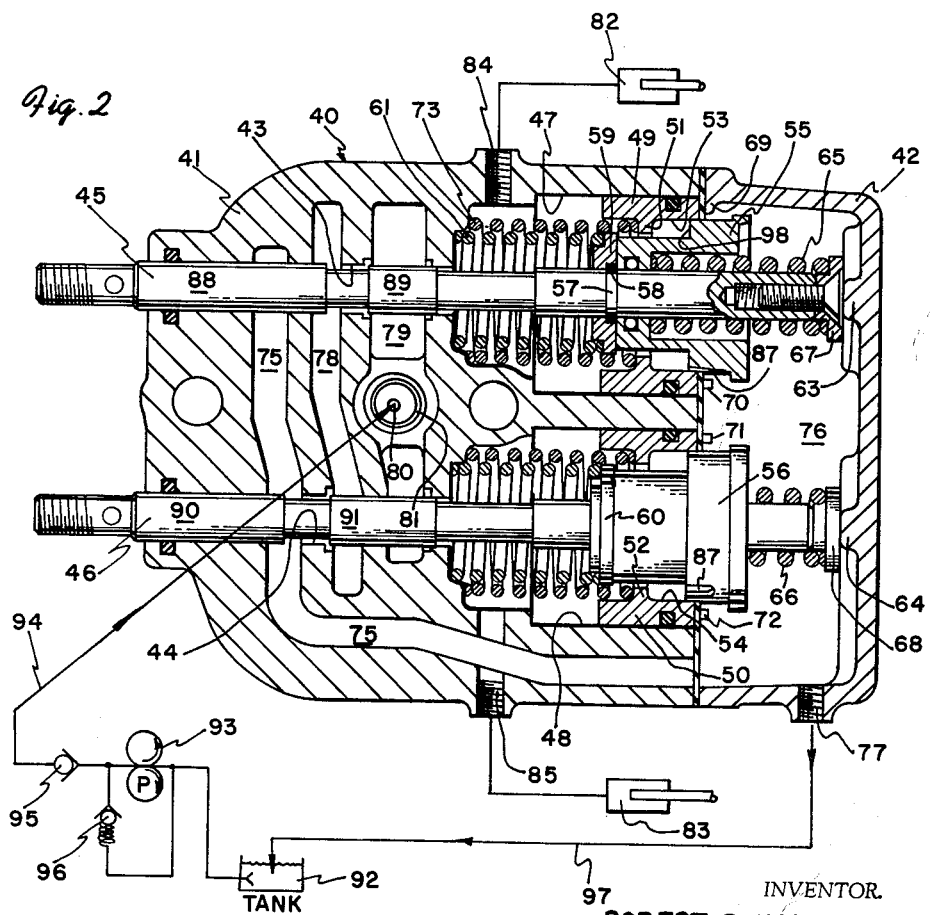
INVENTOR.
ROBERT D. KREHBIEL
BY
ATTORNEY

United States Patent Office 3,166,890
Patented Jan. 26, 1965

3,166,890
COMBINATION CONTROL VALVE AND MASTER CYLINDER
Robert D. Krehbiel, Hutchinson, Kans., assignor to The Cessna Aircraft Company, Wichita, Kans., a corporation of Kansas
Filed Aug. 26, 1963, Ser. No. 304,387
8 Claims. (Cl. 60—10.5)

This invention relates generally to fluid flow control valves for pressurized hydraulic systems, and more particularly to a spool type control valve which includes a fluid displacement chamber and a cooperating fluid displacement member, which render the valve capable of acting as a fluid displacing master cylinder in case of failure of pressure in the hydraulic system in which the valve is interposed.

A prime object of this invention is to provide a valve which can be interposed in a pressurized hydraulic system between the pump or other source of pressurized fluid and a fluid motor to be actuated, and which is capable of actuating said motor by selectively directing pressurized fluid thereto, whether the fluid is pressurized by the source or by fluid displacement accomplished within the valve.

The invention is capable of embodiment in a valve having a single flow control spool for controlling the operation of a single fluid motor, or of multiple fluid motors connected in series. The invention is also capable of embodiment in a valve having two or more control spools for independently controlling the operation of a like number of fluid motors, and also for collectively and simultaneously operating said fluid motors under identical pressures by connecting them in parallel.

The mentioned dual or multiple spool embodiment is primarily suited for use on tractors or track type vehicles which are so designed that they are steered by braking or de-clutching a drive wheel or driven track on one or the other side of the vehicle, while allowing the drive wheel or track at the other side of the vehicle to continue its driving function. The braking or de-clutching operation is performed by a working hydraulic cylinder or motor located at or near each brake or clutch, each motor being under the control of a separate operator actuated control spool in the valve.

The dual spool embodiment of this invention is also well suited for independent or simultaneous actuation of the separate hydraulic braking systems on a tractor-trailer combination road vehicle, making it possible for the operator to first apply the trailer brakes by the movement of one control spool in the valve, and to subsequently apply equalized braking pressure to all brake equipped wheels of both the trailer and tractor, by subsequent movement of the second control spool in the valve.

Other objects of the invention are, therefore, to provide a flow control valve for a pressurized hydraulic system which permits a vehicle operator to selectively control the operation of the brake or clutch actuating cylinder at either side of a vehicle; which permits the operator to cause simultaneous operation of the brake or clutch actuating cylinders at both sides of the vehicle under equalized pressures; and which, in case of hydraulic pressure failure in the system, automatically acts as a master brake or clutch operating cylinder, thereby affording uninterrupted operation of the brake or clutch actuating cylinders by the operator, in an emergency.

The invention, together with other objects, will be more clearly understood when the following description is read in connection with the accompanying drawings, in which:

FIG. 1 is a central longitudinal sectional view through a single spool control valve embodying the invention; and FIG. 2 is a central longitudinal sectional view through a dual spool control valve embodying the invention, and which schematically shows the valve interposed in a pressurized hydraulic system.

The valve illustrated in FIG. 1 includes a pressure-tight housing, designated as a whole by the number 10, made up of a body section 11, and a cap or end plate 12.

Body section 11 is provided with a cannelured valve spool bore 13, which receives a cannelured flow control spool 14. The bore 13 openly communicates at its inner end with a counterbored fluid displacement chamber 15, the outer end of which is closed by a cooperating reciprocable fluid displacing member or piston 16.

Intermediate its ends, and within the cylinder 15, spool 14 carries a spring seat 17, which is secured to the spool by means of a pin 18. The piston 16 is preferably slidable on spool 14, but is normally maintained against spring seat 17, regardless of the relative movement of the spool in the housing. This is accomplished by a coil spring 19 bearing against piston 16 and against a spring seat 20, adjustably secured on the inner end of the valve spool 14 by a threaded stud 21.

A coil spring 22 bears against seat 17 and against a land 23 of the housing bore, thus urging the inner end of the spool to abutt a limit stop 24 carried internally by the housing cap 12, thus normally urging the spool 14 to its neutral position, as shown.

Housing bore 13 is provided with an additional land 25 which lies between a fluid supply chamber 26 and an adjacent fluid return passage 27.

The housing is provided with a motor port 28 for connection to a fluid motor or other hydraulically actuated device. Additionally the housing is provided with a return port 29 for connection to the hydraulic system reservoir (not shown), and a pressure fluid inlet port 30 for connection to a source of pressurized fluid, and which communicates with supply chamber 26 through an orifice 31. In the valve shown, a check valve is inserted between the orifice 31 and the inlet port 30. The check valve is designated by the numeral 32. This check valve is not an essential element of the invention but is useful in case there is a power failure, and the pressure source is no longer able to supply pressurized fluid to chamber 26, as will be explained subsequently.

The cap 12 provides a chamber 33, which is connected to return port 29 by means of a duct 34, to dispose of fluid which leaks past the piston 16 from the chamber 15.

While it is not essential to the operation of the valve, piston 16 is preferably provided with a sloping bottomed longitudinally disposed groove 35, which makes a much smoother operating valve, and which serves to prevent abrupt shocks in the system when the spool is moved by the operator.

As will be seen in FIG. 1 the spool 14 is shown in its neutral position, in which position a spool land 36 cooperates with housing land 23 to prevent communication between the supply chamber 26 and the displacement chamber 15. Due to its position, the land 36 also affords open communication between the supply chamber 26 and the return passage 27.

FIGURE 1 OPERATION

With the spool 14 in its neutral position in the housing, fluid fed into the inlet 30 from the source of pressurized fluid, passes through the check valve 32, through orifice 31 and into supply chamber 26. It then flows through a portion of the spool bore and into return passage 27, out through return port 29, and back to the system reservoir.

When it is desired to actuate the fluid motor which is connected to motor port 28, the operator moves spool 14 outward (to the left in this figure), and land 36 cooptes with land 25 to immediately block the flow of fluid m supply chamber 26 into return passage 27. Simultaneously land 36 opens communication between supply mber 26 and displacement chamber 15. Simultaneous vement to the left is transmitted to piston 16 through spring seat 20, and the spring 19. Fluid under pressure from the source thus travels through port 28 to the id motor. During the initial movement of the spool and the piston 16, there is a limited amount of fluid w through the groove 35. This flow is cut off as soon the piston moves sufficiently far into the cylinder 15 to se the groove 35. When the operator releases pressure spool 14, spring 22 returns the spool to its normal ition, abutting limit stop 24, and shuts off the flow of ssure fluid from chamber 26 into chamber 15. Fluid urning from the fluid motor through port 28 passes m chamber 15 through groove 35 and duct 34, out ough port 29, and to the system reservoir.

If, when the operator forces movement of the spool 14 ward, there is no pressure supplied from the system rce, continued movement of spool 14 causes piston 16 displace fluid from chamber 15 out through port 28 and the fluid motor to be actuated. Thus, in an emergency e to system pressure failure, the piston and its displacent chamber serve as an emergency means of supplying ssurized fluid to the fluid motor to be actuated.

DUAL SPOOL VALVE

The valve illustrated in FIG. 2 includes a pressureht housing, designated as a whole by the numeral 40, de up of a body section 41, and a cap or end plate 42. Body section 41 is provided with a pair of spaced parallel cannelured valve spool bores 43 and 44, which receive nelured valve spools 45 and 46. Bores 43 and 44 enly communicate respectively with counterbored cylin-rs 47 and 48, which slidably receive master cylinder tons 49 and 50.

Pistons 49 and 50 have internal annular shoulders 51 d 52 which define concentric openings which communicate with counterbored cylinders 53 and 54, which slidly receive shouldered pistons 55 and 56, which in turn carried by the valve spools 45 and 46 respectively.

Each valve spool is provided intermediate its ends with annular groove 57 which receives a snap ring 58. The lve spools 45 and 46 carry ring type spring seats 59 and , the inner ends of which bear respectively against the p rings 58.

Compressed coil springs 61 and 62 bear against the dy section, as shown, and their opposite ends bear rectively against the spring seats 59 and 60, thus urging inner ends of valve spools 45 and 46 against stops 63 d 64, integral with caps 42, thus normally maintaining ools 45 and 46 in their respective neutral positions.

Coil springs 65 and 66, which have a considerably greatresistance to compression than springs 61 and 62, bear ainst the pistons 55 and 56, as shown, and their opposite ds bear against spring seats 67 and 68, adjustably secred to the inner ends of the respective valve spools 45 d 46, to afford adjustment of the normal at rest or neu-l positions of the spools 45 and 46, and of the pistons and 56. The springs 65 and 66 are normally comessed only a very small degree.

The piston closed ends of the pistons 49 and 50 are rmally maintained against stops 69–70 and 71–72, which carried integrally by the housing cap 42, by coil springs and 74, which bear against the internal shoulders 51 d 52 of the respective pistons. The opposite ends of se compressed springs bear against the body section , on concentric shoulders surrounding the respective lve spools, as shown.

Body section 41 is provided with a fluid return passage , which preferably but not necessarily interconnects the ool bores 43 and 44, and which openly communicates th a return fluid chamber 76, having a return port 77. cross passage 78 in the body section also interconnects the spool bores 43 and 44, as does a fluid supply or inlet passage 79. Fluid enters inlet passage 79 through an orifice 80 in a replaceable orifice plug 81, screw-threaded into the housing wall at a conduit attachment fitting (not visible). By changing plugs the orifice size can be varied in accordance with the fluid volume requirements of the fluid motors to be actuated.

Piston cylinders 47 and 48 are in open communication with separate brake or clutch actuating cylinders 82 and 83 through motor ports 84 and 85 respectively, and are in limited communication with return chamber 76 through sloping bottomed notches or grooves 86 and 87 cut into the circumferential surfaces of the respective pistons 55 and 56, as shown. It should be noted that motor port 85 does not communicate with return passage 75.

Flow of pressure fluid through the various passages, motor ports, etc. is, of course, controlled by lands 88 and 89 on spool 45, and by lands 90 and 91 on spool 46, and by the relative outward movement of the respective spools in their bores.

The described valve is interposed in a hydraulic system which includes a fluid reservoir or tank 92, a power driven fluid pressurizing pump 93 having an intake connected to the reservoir, a fluid delivery conduit 94 connected to the pump discharge and delivering fluid through a check valve 95, through orifice 80 into the fluid supply passage 79. As in the previously described single spool valve, check valve 95 may be installed as a part of the control valve unit. If the pressurized fluid source, pump 93, is of the irreversible type, and will not permit the reverse flow of fluid back through the pump, the check valves 32 and 95 in the respective embodiments may be eliminated entirely. A system relief circuit is preferably provided by means of a spring pressed relief valve 96 in a conduit having one end connected to the pump delivery line 94 at a point between the pump and the check valve 95, and having its other end connected either to the tank or to the pump intake line, as shown. A conduit 97 conducts return fluid from return port 77 to the tank 92.

NEUTRAL OPERATION—SYSTEM PRESSURIZED

With both valve spools in their neutral positions as shown in the drawing, spool lands 89 and 91 block communication between fluid supply passage 79 and the respective displacement chambers 47 and 48, and 53 and 54.

Fluid flows from the pump through check valve 95, through orifice 80, passage 79, past the left end of land 89, through a short section of bore 43, into cross passage 78, past land 91 into return passage 75, and thence to chamber 76, out port 77 through conduit 97 to the tank 92.

SINGLE MOTOR OPERATION—SYSTEM PRESSURIZED

Assuming that each of the valve spools can be moved outward with respect to housing 10, or to the left in the drawing, by suitable hand or preferably foot operated mechanical linkage, if the operator wishes to independently actuate cylinder 82, he moves spool 45 outward.

As a result of such movement, spool land 89 blocks communication between supply passage 79 and cross passage 78, and opens communication between the supply passage 79 and cylinder 47, which is openly connected to motor 82. A limited quantity of fluid also flows from cylinder 53 through metering notch 87 into return chamber 76.

Such outward spool movement compresses spring 61, and spring 65 forces piston 55 to move inward in its cylinder 53 along with the valve spool. As spool 45 is moved farther outward, oil flow through notch 87 is gradually closed off, thus raising the fluid pressure in cylinder 47 to the full system pressure supplied by the pump 93, and causing working cylinder 82 to be actuated. "Feel" is provided for the operator by the resistance of piston 55 to movement to the left against the rising pressure in chamber 47.

When actuation of working cylinder 82 has accomplished the desired result the operator frees spool 45, and it is returned by spring 61 to its neutral position. This relieves cylinder 47 from system pressure and fluid is free to flow from cylinder 82 back through port 84 into cylinders 47 and 53, and out through notch 87 to return chamber 76, and thence to the tank 92.

Independent actuation of fluid motor 83 at the oher side of the vehicle (or of a plurality of such cylinders connected in parallel) is accomplished by movement of spool 46 outward. Spool land 91 then blocks flow between passages 78 and 75 and diverts flow into displacement chamber 48. Continued spool movement causes a rise in pressure in cylinder 48, and fluid is forced through motor port 85 to actuate the motor 83.

SYSTEM PRESSURIZED SIMULTANEOUS OPERATION OF BOTH WORKING CYLINDERS

If the operator moves both spool moving linkages at the same time, outward spool movement causes lands 89 and 91 to direct pressurized fluid from passage 79 into both the cylinders 47 and 48, thereby actuating both the fluid motors 82 and 83 simultaneously, and under the same fluid pressure. The reason for this is that whether spools 45 and 46 are moved outward an equal distance, open communication between the cylinders 47 and 48 is afforded by the bore connecting supply passage 79, as soon as both lands 89 and 91 have moved sufficiently far to the left to unblock the respective adjacent bore passages. Hence the fluid motors 82 and 83 are indirectly in open communication, and the pressures applied to the plungers in the respective working cylinders is equalized. This provides equal braking action if the cylinders are connected to wheel brakes, which is a very desirable feature.

SINGLE CYLINDER OPERATION—WITHOUT HYDRAULIC SYSTEM PRESSURE

In case the pump 93 fails, or in case an independent power unit driving the pump fails, or if there is a break in the conduit supplying pressure fluid to valve passage 79, the valve described above will nevertheless actuate the working cylinders 82 and 83, either independently or simultaneously. It simply acts as two separate master brake cylinders, or as a pair of such cylinders compounded.

In the initial stage, under operator control, the valve spool 45 (or 46), and the piston 55 (or 56) are moved to the left as above described. If the connected working cylinder fails to actuate the wheel brake (or clutch), due to lack of pressure in the system, the operator depresses his foot pedal farther, which moves the valve spool 45 until the shoulder 98 on piston 55 (or 56) contacts the internal shoulder 51 on piston 49. Further movement of the valve spool 45 leftward causes like movement of both pistons 49 and 55 as a single increased diameter fluid displacement member. Fluid is thus displaced from cylinder 47 under operator created pressure and is forced through port 84 to brake or clutch actuating cylinder 82 until the desired result is obtained.

During this power-off operation, fluid from cylinder 47 (or 48) cannot escape from passage 79, even though this passage and either or both of the cylinders 47 and 48 are in open communication, because lands 89 and/or 91 block escape of fluid into return passages 75 and 78, and check valve 95 prevents escape of fluid through the orifice 80.

Simultaneous movement of both valve spools results in simultaneous actuation of both working cylinders 82 and 83, under equalized pressures, as will be clear from the above described operation under power-on and power-off conditions.

It will be seen that the described valve accomplishes the objects enumerated hereinabove.

Having described the invention with sufficient clarity to enable those familiar with this art to construct and use it, I claim:

1. A control valve for selectively dispensing fluid under pressure to a brake actuating fluid motor, said valve comprising:
   a housing defining a fluid displacement chamber, and having
   (a) a fluid inlet port for connection to a source of fluid under pressure,
   (b) a fluid outlet port for connection to a fluid return line, and
   (c) a motor port in communication with said fluid displacement chamber, for connection to a device to be fluid actuated;
   a cannelured valve spool bore in the housing axially aligned with said chamber, their respective inner ends being in communication;
   a cannelured valve spool reciprocable in said bore, and having its outer end extending outside the housing for forcible reciprocation, and its inner end extending into the displacement chamber;
   means carried by the inner end of said valve spool for displacing fluid from said chamber outward through said motor port when said valve spool is moved from a neutral position;
   a supply passage in the housing adjacent the displacement chamber, communicating with the valve spool bore and with said inlet port;
   a fluid return passage in the housing communicating with said bore, and through a portion of the bore, with said supply passage, and also communicating with said outlet port;
   said spool in its neutral position blocking communication between the supply passage and the displacement chamber, and affording communication between the supply passage and the return passage;
   said spool, when moved away from its neutral position, blocking communication between the supply passage and the return passage, and affording communication between said supply passage and said displacement chamber;
   whereby movement of the valve spool from its neutral position, with accompanying movement of the fluid displacing means carried by the valve spool, dispenses fluid under pressure from the displacement chamber outwardly through said motor port.

2. The valve described in claim 1 in which the means for displacing fluid from said chamber includes:
   a hollow outer shell reciprocable in said chamber, and internally defining a fluid displacement cylinder open at both its ends;
   an internal stop carried by said shell;
   a second stop carried by the housing, limiting outward movement of the shell in its chamber;
   spring means urging said shell toward the outer end of said chamber against said second stop;
   a piston closing the outer end of said cylinder and reciprocable therein, and carried by said spool, the internal stop on said shell being located in the path of travel of said piston as it travels with the valve spool in a fluid displacing direction;
   and means maintaining the piston near the outer end of its cylinder in the shell when the valve spool is in its neutral position,
   whereby initial movement of the valve spool outward away from its neutral position results in movement of said piston in a fluid displacing direction, the rate of fluid displacement being relatively small due to the relative displacement areas of the piston and the much larger displacement chamber,
   and as a result of continued spool movement in the same direction, the piston contacts the internal stop on the shell and forces the shell to move in a fluid displacing direction, subsequent unitary movement of both piston and shell serving to displace fluid from the chamber at a relatively higher rate due to the relatively larger displacement area of both piston and shell combined.

3. The valve described in claim 1, and spring means for normally maintaining said valve spool in its neutral position.

4. The valve described in claim 1, and a one way check valve through which fluid from the source must pass to reach said supply passage, said check valve serving to prevent fluid displaced by the displacing means from being forced outward through the inlet port in case of pressure failure at the pressure fluid source.

5. The valve described in claim 1 in which the displacement chamber is in the form of a cylinder, and the means for displacing fluid therefrom is a cooperating piston reciprocable therein.

6. The valve described in claim 5 in which the piston has limited slidable movement on the inner end of the spool;
and spring means urging the piston to travel with the spool in a fluid displacing direction when the spool is moved away from its neutral position.

7. The valve described in claim 5 in which the piston has limited longitudinal movement on the inner end of the spool;
a stop carried by the spool, limiting movement of the piston toward the outer end of the spool;
a spring seat carried by the inner end of the spool;
and a spring bearing against the spring seat and against the piston, and urging the piston against said stop, and thereby urging the piston to travel with the spool against fluid pressure in the cylinder, in response to outward movement of the spool away from its neutral position.

8. In a hydraulic system which includes a power driven pump and a pair of hydraulic working cylinders to be actuated, a supply line connected to the pump discharge port for supplying pressurized fluid to said working cylinders, a check valve in said line to prevent fluid in the line from traveling into the pump discharge port, a fluid reservoir connected to the pump intake port, and conduit means affording flow of fluid from said working cylinders to said reservoir,
a control valve interposed in said system for actuating either of said working cylinders independently or actuating both simultaneously, whether or not the pump is supplying pressurized fluid to the system, said valve comprising:
a housing having two fluid displacement chambers, each being in open communication with a respective one of said working cylinders, said housing also having a fluid supply passage connected to the pump supply line, and an outlet connected to said reservoir;
a pair of valve spool bores in said housing, each communicating with a respective one of said displacement chambers and with said supply passage;
a pair of displacement members, each reciprocable in a respective one of said chambers;
a pair of valve spools, each reciprocable in a respective one of said spool bores, and each connected to and reciprocable with a respective one of said displacement members, one end of each valve spool projecting from the housing to facilitate its forcible reciprocation;
spring means urging each valve spool and its connected displacement member toward neutral positions in their respective bores and displacement chambers;
a fluid return chamber in the housing;
a longitudinally disposed groove in the peripheral surface of each fluid displacement member affording limited communication between its displacement chamber and said return chamber when the displacement member is in its neutral position, and capable of progressively reducing and eventually blocking such limited communication as the fluid displacement member is moved away from its neutral position in a direction to displace fluid from its chamber;
a cross passage in the housing in communication with both spool bores, and through one of said spool bores with said supply passage;
a fluid return passage in the housing communicating through the other of said spool bores with said cross passage, and also in communication with said return chamber,
whereby, with both valve spools in their neutral positions, pressure fluid flows into the supply passage, to the cross passage, into the return passage, to the return chamber, and thence to the system reservoir; when either of said spools is moved from its neutral position it opens communication between the supply passage and the corresponding displacement chamber, and simultaneously blocks flow of fluid from the supply passage through the cross passage to the return passage, and corresponding movement of the spool connected displacement member reduces and eventually blocks flow of fluid from the corresponding displacement chamber into the return chamber, and forces fluid to flow from the corresponding displacement chamber to the connected working cylinder to actuate it; and in the absence of pump pressured fluid in the particular displacement chamber, continued movement of the spool causes the connected displacement member to displace fluid from its chamber and to force the fluid under displacement pressure to the connected working cylinder to actuate it; and simultaneous movement of both valves away from their neutral positions directs fluid from the supply chamber into both fluid displacement chambers and interconnects them, simultaneously blocking flow of fluid from the supply passage to the return passage; and corresponding movement of the respective spool connected displacement members forces flow of equally pressurized fluid from each displacement chamber to its connected working cylinder to actuate it, whether the pressure on the fluid is pump or displacement created.

References Cited by the Examiner
UNITED STATES PATENTS

| 1,662,096 | 3/28 | Zelov | 60—52 X |
| 2,004,078 | 6/35 | McDougall | 60—52 |
| 2,282,472 | 5/42 | Herman et al. | 60—54.6 X |
| 2,395,811 | 3/46 | Griffith | 60—10.5 |
| 2,887,187 | 5/59 | Fletcher et al. | 60—54.6 X |
| 2,946,195 | 7/60 | Hare | 60—54.5 |
| 2,959,450 | 11/60 | Gladden et al. | 60—54.6 X |
| 3,075,355 | 1/63 | Baker | 60—52 X |

JULIUS E. WEST, *Primary Examiner.*
ROBERT R. BUNEVICH, *Examiner.*